(12) United States Patent
Li et al.

(10) Patent No.: US 8,335,390 B2
(45) Date of Patent: Dec. 18, 2012

(54) BLUR FUNCTION MODELING FOR DEPTH OF FIELD RENDERING

(75) Inventors: Pingshan Li, Sunnyvale, CA (US); Gazi Ali, Santa Clara, CA (US)

(73) Assignee: Sony Corporation, Tokyo (JP)

( * ) Notice: Subject to any disclaimer, the term of this patent is extended or adjusted under 35 U.S.C. 154(b) by 453 days.

(21) Appl. No.: 12/728,309

(22) Filed: Mar. 22, 2010

(65) Prior Publication Data

US 2011/0229052 A1 Sep. 22, 2011

(51) Int. Cl.
*G06K 9/40* (2006.01)
*H04N 5/232* (2006.01)
*G03B 7/00* (2006.01)

(52) U.S. Cl. ............ 382/255; 348/345; 396/63

(58) Field of Classification Search ......... 382/106, 382/168, 173, 255, 264, 275, 305, 312; 348/36, 348/207.99, 345, 362; 396/62, 63, 77, 104
See application file for complete search history.

(56) References Cited

U.S. PATENT DOCUMENTS

| | | | |
|---|---|---|---|
| 5,124,740 A * | 6/1992 | Wheeler | 396/62 |
| 5,130,739 A * | 7/1992 | O'Such et al. | 396/63 |
| 6,268,863 B1 | 7/2001 | Rioux | |
| 6,504,571 B1 | 1/2003 | Narayanaswami et al. | |
| 7,098,954 B2 * | 8/2006 | Suda et al. | 348/347 |
| 8,027,582 B2 * | 9/2011 | Li | 396/104 |
| 8,045,046 B1 * | 10/2011 | Li et al. | 348/349 |
| 8,194,995 B2 * | 6/2012 | Wong et al. | 382/255 |
| 8,199,248 B2 * | 6/2012 | Li et al. | 348/353 |
| 8,218,061 B2 * | 7/2012 | Baxansky | 348/345 |
| 8,229,172 B2 * | 7/2012 | Wong et al. | 382/106 |
| 2004/0196379 A1 | 10/2004 | Chen et al. | |
| 2004/0252906 A1 | 12/2004 | Liege et al. | |

FOREIGN PATENT DOCUMENTS

| | | |
|---|---|---|
| WO | 2007057808 A2 | 5/2007 |
| WO | 2007147999 A1 | 12/2008 |

OTHER PUBLICATIONS

Lee, S. et al.—"Real-time Depth-of-Field Rendering Using Point Splatting on Per-Pixel Layers"—Pacific Graphics, vol. 27, No. 7, pp. 1955-1962, 2008.
Kraus, M.—"Quasi-Convolution Pyramidal Blurring"—GRAPP 2008, Proc. of the 3rd Inter. Conf. on Comp. Graphics Theory and Applications, pp. 155-162, Portugal, Jan. 22-25, 2008.
Krivanek, J. et al.—"Fast Depth of Field Rendering with Surface Splatting"—Proceedings from Computer Graphics International 2003.
Korean Intellectual Property Office, International Search Report and Written Opinion, counterpart PCT Application No. PCT/US2011/024832, including claims searched, Sep. 22, 2011, pp. 1-14.

\* cited by examiner

*Primary Examiner* — Kanjibhai Patel
(74) *Attorney, Agent, or Firm* — John P. O'Banion

(57) ABSTRACT

A method and apparatus of depth of field rendering which simulates larger apertures for images captured at a smaller aperture. The depth of field rendering provides selective simulation of out-of-focus effects which are attainable with cameras having a larger aperture when capturing images at a smaller aperture. A blur function model is created based on the relationship between the blur change and the aperture change. This model is used to determine the blur difference which would arise between two images taken at two different apertures. Then the out-of-focus effect is generated by blurring the image in a rendering process based on the blur difference.

24 Claims, 9 Drawing Sheets

BLUR FUNCTION MODELING FOR DEPTH OF FIELD RENDERING

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image capture devices, and more particularly to camera depth of field rendering.

2. Description of Related Art

Aperture stops of photographic lenses and cameras provide control of the amount of illumination reaching an image sensor (or photosensitive film). Aperture control, in combination with control of shutter speed, regulate the extent of light exposure when capturing an image. It will be recognized that use of fast shutter speeds or image capture in low light conditions require larger apertures to obtain a correct exposure. Conversely, smaller apertures are used for intense light conditions and slower shutter speeds to obtain correct exposure.

Lens aperture is typically expressed as an f-number, which is the ratio of focal length to effective aperture diameter. A lens often provides a set of marked "f-stops" that the f-number can be set to. Lower f-numbers are indicative of larger aperture openings. A change of "one f-stop" refers to a factor of $\sqrt{2}$ (e.g., about 1.41) change in f-number and corresponds to a factor of two change in the light intensity being passed through the lens when capturing an image.

Although small to medium sized cameras have become extremely popular with regard to their light weight, portability and low cost, they typically suffer from having severely limited aperture sizes. Toward providing sufficient lighting through these small aperture lenses, increasingly sensitive image sensors have been sought to allow these small cameras to be utilized with faster shutter speeds or in lower lighting conditions. However, obtaining sufficient lighting to capture an image does not make a small aperture lens equivalent to a conventional large aperture lens.

Accordingly, a need exists for an apparatus and/or a method which is capable of increasing the lens aperture of a camera-lens system while not increasing its size or cost. These needs and others are met within the present invention, which overcomes the deficiencies of previously developed camera systems and methods.

BRIEF SUMMARY OF THE INVENTION

The present invention is a camera apparatus and method which overcomes additional shortcomings of camera systems which have limited physical aperture sizes. In the present invention it has been recognized that much of the control provided by larger aperture lenses is lost when one is constrained to using low aperture lenses. In particular with respect to the ability of using shallow focus techniques in which a small depth of field is utilized to focus a single plane of the image while the remaining image planes are out of focus. Shallow focus typically is used to emphasize one part of the image over another. In the phraseology of photographers the area which is out of focus is often referred to as "bokeh", which is a Japanese term for the subjective aesthetic quality of out-of-focus areas of a photographic image. It will be appreciated that small aperture lenses are substantially constrained to providing only a deep focus in which the entire image is in focus. Controlling depth of focus (e.g., from deep to shallow) is often used in portraiture work to isolate subjects from their respective backgrounds and to deemphasize unimportant details which might otherwise distract the viewer.

An apparatus and method for providing depth of field rendering is described herein which allows even a small aperture camera to provide results which have previously only been attainable through the use of large aperture camera systems. The object of the present system provides for simulating out-of-focus effects of a larger aperture when an image is captured with a physically smaller aperture. The term "digital aperture", or "digital aperture size", is used herein to refer to a simulated aperture size which is larger than that which is attainable by the physical aperture of the camera apparatus.

To simulate shallow focus effects, embodiments of the present invention utilize a blur function model which is based on the relationship between the blur change and the aperture change. This model is used for estimating blur difference arising between two images taken at two different apertures. Out-of-focus effects are then generated by blurring the image based on the blur difference.

Blur difference is determined in response to capturing at least two pictures in at least two different focus positions. The distance between the two focus positions being preferably about one depth of field. Blur difference between the pictures at the two focus positions are determined by the number of convolutions between the sharper image and a blur kernel needed to match the blurrier image. A blur matching curve is then obtained by placing a subject at a fixed distance, capturing one image at every one depth of field from minimal focus distance to infinity, then calculating blur difference between every two adjacent pictures.

Defocus blur of an image is defined as the blur difference between the image and the corresponding in-focus image. Defocus blur of an image is the sum of the iteration number from the in-focus position to where the image was taken and can be determined by $B=\frac{1}{2}kI^2$ for an ideal lens in a matching curve in which k is the slope and I is the iteration number of the lens position where the image was captured.

Apparatus and method of the invention are preferably based on an ideal lens even though it may depart in some ways from the physical camera lens. Specifically the real lens is subject to optical artifacts and distortions and its matching curves may be noisy and inconsistent. In contrast to this, the ideal lens provides a matching curve which is smooth and straight (linear), and has a slope with respect to depth-of-field (DOF) which is constant for different apertures. Blur functions on the ideal lens should follow a Gaussian distribution.

The invention is amenable to being embodied in a number of ways, including but not limited to the following descriptions.

One embodiment of the invention is an apparatus for depth of field rendering on captured images to simulate an out-of-focus effect as would arise in response to using a larger aperture, comprising: (a) an imaging element having an aperture and configured for capturing digital images at a focus setting; (b) a computer processor, and associated memory, coupled to the imaging element and configured for processing digital images received from the imaging element; and (c) programming executable on the processor for, (c)(i) capturing at least two images at different focus positions using an identical aperture setting, (c)(ii) dividing images into subimage blocks, (c)(iii) determining blur differences between subimage blocks of the images based on a matching curve for the imaging element as a relationship between iteration number and lens focus position, (c)(iv) determining defocus blur between subimage blocks of the images, and (c)(v) blurring subimage blocks of the images by a number of convolutions with a blur kernel in response to blur difference determined between said images to generate a resultant image simulating utilization of a larger aperture. It should be appreciated that the number of convolutions is zero when the blur difference is zero.

The apparatus generates a digital image captured with said imaging element at a first aperture setting which appears as if captured at a second aperture setting which is larger than the first aperture setting. A digital aperture size is selected according to the invention to exceed the physical aperture size attainable by the apparatus in response to detecting a given set of image conditions, such as in response to facial detection within an image being captured.

In preferred implementations, the matching curve is retained in the memory of the apparatus in response to capturing a sequence of images across a focal range of the apparatus to establish a relationship between iteration number and lens focus position. The amount of defocus blur for an image can be determined in response to the matching curve by summing iteration numbers in an interval between an in-focus, first position, and a second position. It will be appreciated that the slope of said matching curve is inversely proportional to the square of the f-number.

In at least one implementation, defocus blur is given by $$B = \frac{1}{2}sI$$
$$= \frac{1}{2}ks^2$$
$$= \frac{1}{2k}I^2$$

where defocus blur B is determined in response to iteration number I, depths-of-field (DOFs) s away from an in-focus position, and matching curve slope k. In at least one implementation, blur difference is given by equation $$B_2 - B_1 = \left[\frac{1}{h^2} - 1\right]B_1$$
$$= \left[\left(\frac{A_1}{A_2}\right)^2 - 1\right]B_1,$$

in which $B_1$ and $B_2$ is blurring level which would arise at first and second apertures $A_1$ and $A_2$ (f-number), and h is a constant defining extent of aperture change. Additionally, the apparatus has a user interface with at least one user input control for selecting a digital aperture size which exceeds the attainable physical aperture sizing of the apparatus, or selecting an operating mode which sets digital aperture size to exceed that which is attainable by the physical aperture sizing of the apparatus.

One embodiment of the invention is an apparatus for depth of field rendering on captured images to simulate out-of-focus effects as would arise in response to using a larger physical aperture than attainable on the apparatus, the apparatus comprising: (a) an imaging element having an aperture and configured for capturing digital images at a focus setting; (b) a computer processor and memory coupled to the imaging element and configured for processing the digital images as received; and (c) programming executable on the processor for, (c)(i) detecting user input for selecting a digital aperture size, or a mode associated with use of a digital aperture size, (c)(ii) capturing at least two images at different focus positions using an identical aperture setting, (c)(iii) dividing images into subimage blocks, (c)(iv) determining blur differences between subimage blocks of images based on a matching curve for the imaging element as a relationship between iteration number and lens focus position, (c)(v) determining defocus blur between subimage blocks of images, and (c)(vi) blurring subimage blocks of images by a number of convolutions with a blur kernel in response to blur difference determined between images to generate a resultant image. The resultant image is generated with an apparent digital aperture size which exceeds the physical aperture size that the apparatus is capable of attaining.

One embodiment of the invention is a method of capturing images simulating an aperture larger than attainable by physical aperture sizing of an imaging element within a camera apparatus, comprising: (a) capturing at least two images at different focus positions using an identical aperture setting of a camera apparatus; (b) dividing images into subimage blocks; (c) determining blur differences between subimage blocks of the images based on a matching curve for the imaging element as a relationship between iteration number and lens focus position; (d) determining defocus blur between subimage blocks of the images; and (e) blurring subimage blocks of images by convolution with a blur kernel in response to blur difference determined between images to generate a resultant image. The resultant image is generated with an apparent digital aperture size which exceeds attainable physical aperture sizing of said apparatus.

The present invention provides a number of beneficial aspects which can be implemented either separately or in any desired combination without departing from the present teachings.

An aspect of the invention is an apparatus and method for simulating the use of a larger aperture using depth of field rendering.

Another aspect of the invention is the generation of an image which simulates a shallow focus from a large aperture in response to capturing at least two images with a smaller aperture at different focus distances.

Another aspect of the invention is the generation of an image at a higher camera aperture setting (digital aperture) than can be attained by the camera in response to its limited physical aperture size.

Another aspect of the invention is the use of an underlying matching curve model which delineates the relationship between iteration number and lens focus position.

Another aspect of the invention is the modeling of a relationship between blur change and aperture change which is then used for rendering blur with respect to depth of field.

Another aspect of the invention is the use of a blur kernel configured for matching aspects of an out-of-focus image and is applied to an in-focus image in rendering blur into out of focal plane portions of the image.

Another aspect of the invention is the ability to generate a desired depth of field, regardless of the physical aperture of the camera device.

A still further aspect of the invention is a method which can be applied to a number of different image capture systems, including still cameras.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 11. It will be appreciated that the apparatus may vary as to configuration and as to details of the parts, and that the method may vary as to the specific steps and sequence, without departing from the basic concepts as disclosed herein.

1. Blur Difference.

When the subject is in focus, the captured image is the sharpest. It becomes blurrier as the lens moves away from the in-focus position. Generally, when two images (also referred to herein as pictures) are taken at two different focal distances, the one taken closer to the subject distance (subject distance is closest match to focus distance) is sharper than the other. The focus distances at which the pictures are taken and the amount of blur difference between these two pictures can be used to estimate the actual subject distance, or depth.

Figure 1:
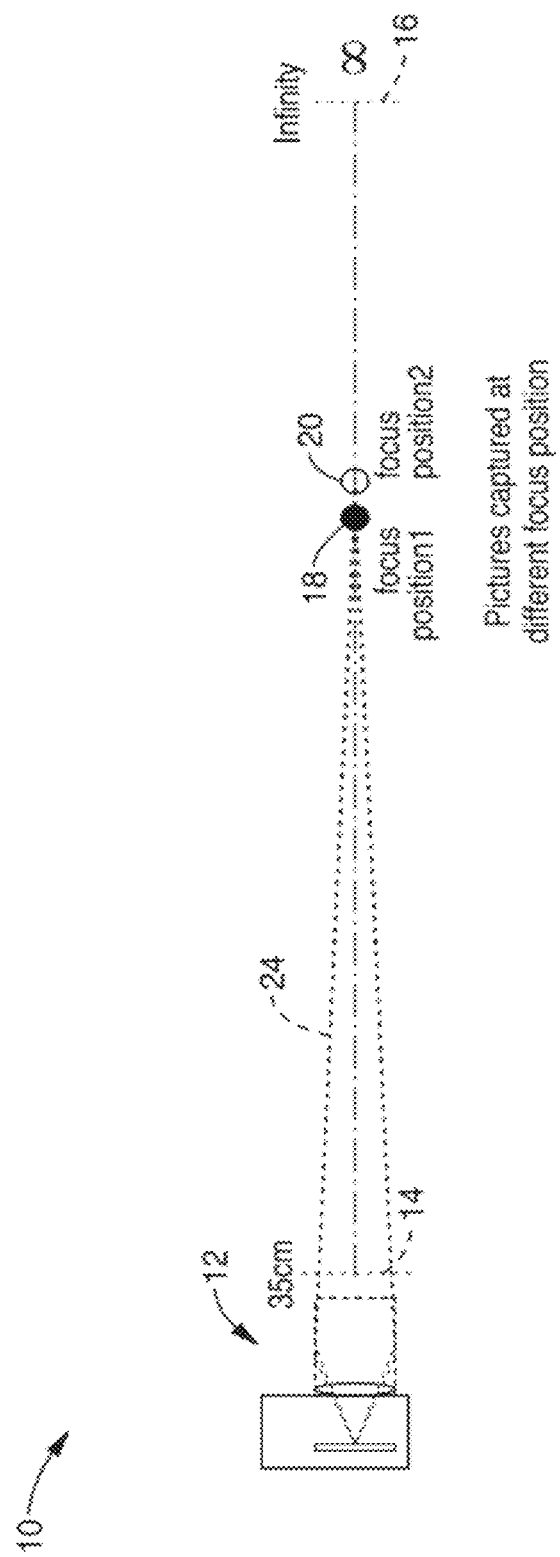
FIG. 1 is a schematic of capturing images at different focal distances according to an aspect of the present invention.

FIG. 1 depicts image capture 10 by an imaging device (e.g., camera) 12 at two different focus positions. The imaging device 12 is shown which can focus from a minimum focal length 14 on out to infinity 16. Minimum focal distance 14 (e.g., in this case 35 cm) is shown as well as focus at infinity 16. Focus converges to first focal position 18 and then to a second focal position 20 along focal path 24.

Suppose two pictures $F_1$ and $F_2$ are captured at two different focusing positions (e.g., 18, 20 of FIG. 1), with $F_1$ being sharper than $F_2$. The blur change can be modeled by a point spread function P:

$$F_1 * P = F_2$$

where * denotes two dimensional convolution. In addition, the point spread function P can be approximated by using a series of convolutions by a blur kernel K:

$$P \approx K * K * \ldots * K. \quad (1)$$

By way of example and not limitation, in the testing performed herein the kernel K was chosen to apply a blur, and selected as a matrix exemplified as follows:

$$K = \frac{1}{64}\begin{pmatrix} 1 & 6 & 1 \\ 6 & 36 & 6 \\ 1 & 6 & 1 \end{pmatrix}. \quad (2)$$

The Gaussian kernel applies a uniform amount of blur, and can be configured in a number of different ways without departing from the teachings of the present invention.

Then the amount of blur difference between $F_1$ and $F_2$ can be measured by the number of convolutions in Eq. 1. In actual implementation, the blur difference between $F_1$ and $F_2$ is obtained by an iteration process, such as given by the following:

$$I_{1\_2} = \underset{I}{\mathrm{argmin}} \left\| F_1 * \underbrace{K * K * \ldots K}_{I \text{ convolutions}} - F_2 \right\| \quad (3)$$

$\|\cdot\|$ denotes a norm operator that evaluates the blur matching error between $F_1$ and $F_2$.

2. Matching Curves.

A matching curve is a relationship between the iteration number and the lens focus position. In one embodiment the matching curve can be obtained for a given depth by capturing a sequence of images across the focal range of the lens, from which blur difference is then calculated between every two pictures. The first picture of the sequence, for example, can be taken with focus set to infinity (e.g., 16 in FIG. 1), and successive pictures taken with each movement of the lens one depth of field closer, until the lens reaches minimal focus distance (e.g., 14 in FIG. 1). This sequence of pictures is denoted by $F_0, F_1, \ldots, F_{N-1}$, where N is the length of the sequence.

Figure 2:
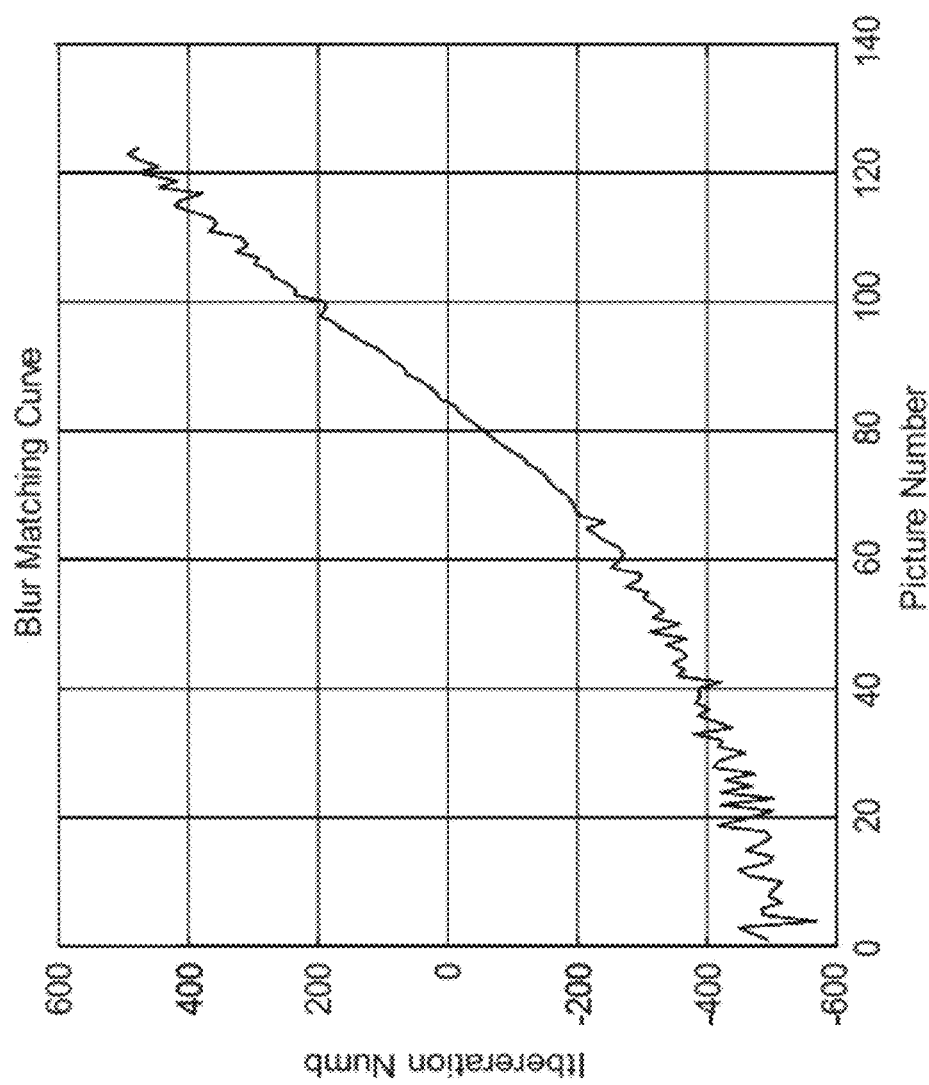
FIG. 2 is a graph of a blur matching curve shown according to an aspect of the present invention.

FIG. 2 illustrates a blur matching curve as an example of the relationship for a given camera device between the iteration number and focus positions. By way of example, the sequence in these tests was captured by a Sony DSC-HX1 camera at a focal length of about 100 mm and aperture f/5.2, with the subject being a step edge image (e.g., white on one portion and black on an adjacent portion with a step edge transition between the two). In this example, the blur difference of $F_i$ and $F_{i+1}$ is calculated for $i=0, \ldots, N-1$.

It should be appreciated that the sign of the blur difference values just provides a convenient means for denoting which image is sharper. If the sign is positive, $F_i$ is sharper than $F_{i+1}$. Otherwise if the sign is negative, $F_{i+1}$ is sharper.

The "picture number" axis indicates the image pairs for which the iteration number is calculated. In this example, picture number i means that the iteration number is calculated between $F_i$ and $F_{i+1}$. It can be seen that the number of iterations increases as the lens focus position moves away from the subject distance. The zero-crossing point is considered to be the position at which the subject is in focus.

Ideally, the matching curve should be a straight line, while its slope should be independent of focal length and aperture. However, as a consequence of optical artifacts and other types of noise, the matching curve obtained from a real lens may be noisy and inconsistent.

3. Blur Function Modeling for Ideal Lens.

Defocus blur of an image at a specific lens position is the blur difference between the image at that position and the image when in focus. Given a matching curve, the amount of defocus blur of an image can be computed as the sum of the iteration numbers in the interval from the in-focus position and the position at which the image was taken.

Figure 3:
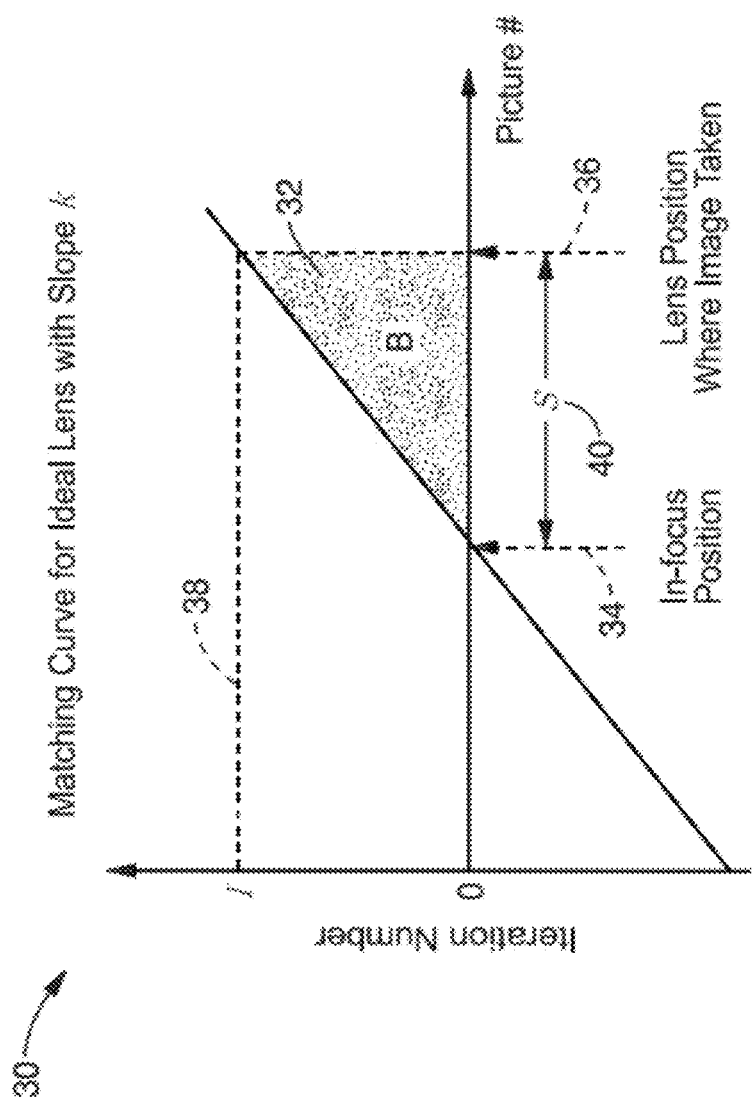
FIG. 3 is a graph of defocus blur in a matching curve shown modeled for an ideal lens according to an aspect of the present invention.

FIG. 3 depicts a graph 30 of defocus blur shown represented as the area of the shaded region 32. In-focus position 34 is shown at the $0^{th}$ iteration number with the position 36 representing the position at which the image was captured and corresponds to iteration number I 38. Position 36 is shown to be s 40 depths-of-field (DOFs) away from the in-focus position 34. The slope of this idealized matching curve is represented by k, wherein the defocus blur is given by the following:

$$B = \frac{1}{2}sI = \frac{1}{2}ks^2 = \frac{1}{2k}I^2. \qquad (4)$$

Given an aperture A (f-number), the depth of field can be calculated as follows:

$$DOF = \frac{2Ac(m+1)}{m^2 - \left(\frac{Ac}{f}\right)^2} \approx 2Ac\left(\frac{m+1}{m^2}\right) \qquad (5)$$

where $$m = \frac{f}{d-f}$$

is the magnification factor, and c is the maximum permissible circle of confusion. Eq. 5 shows that given the focal length f and subject focus distance d, DOF is proportional to A.

Suppose a picture $F_1$ is captured at aperture $A_1$ when at focus position $s_1$, where $s_1$ is measured in response to the number of DOFs it is displaced from the subject depth. When the aperture changes to $A_2=hA_1$ with some factor h indicated the amount of desired change in the aperture, according to Eq. (5) with an image captured at $s_2=hs_1$ then the same amount of defocus blur as in $F_1$ is arrived at. Here $s_2$ is measured in the unit of "DOF for $f/A_1$" from the subject position:

$$\tfrac{1}{2}s_2 \ast I_2 = \tfrac{1}{2}s_1 \ast I_1 \qquad (6)$$

which yields the following:

$$I_2 = \frac{s_1 I_1}{s_2} = \frac{1}{h}I_1. \qquad (7)$$

Therefore the slope for the matching curve for aperture $f/A_2$ in the $f/A_1$ coordinate system is given by:

$$k_2 = \frac{I_2}{s_2} = \frac{\frac{1}{h}I_1}{hs_1} = \frac{1}{h^2}k_1. \qquad (8)$$

The slope of the matching curve is inversely proportional to the square of f-number.

If a picture $F_2$ is captured with $f/A_2$ at the same focus position $s_1$ where $F_1$ is captured, the defocus blur of $F_2$ is equal to:

$$B_2 = \frac{1}{2}k_2 s_1^2 = \frac{1}{h^2}B_1. \qquad (9)$$

Therefore the blur difference between $F_2$ and $F_1$ is then given as:

$$B_2 - B_1 = \left[\frac{1}{h^2} - 1\right]B_1 = \left[\left(\frac{A_1}{A_2}\right)^2 - 1\right]B_1. \qquad (10)$$

The above blur function model is then utilized as described in the following section for depth of field rendering.

The value $B_2 - B_1$ represents the blur difference between two images captured at the same lens position but different apertures. It will be appreciated that according to preferred embodiments of the present invention, $B_2$ corresponds to aperture $A_2$ representing use of an aperture which is beyond the physical capability of the lens, while $B_1$ corresponds to use of aperture $A_1$ which is within the physical aperture range of the lens. During lens simulation an image is captured with a lens of small aperture $f/A_1$, from which an image can be generated using Eq. 10 as if it had been captured at $f/A_2$. For example, if an image $F_1$ is captured with the foreground object in focus and the background out of focus, the defocus blur $B_1$ for the foreground object area should be 0 (no defocus blur). Therefore, $B_2 - B_1$ should be 0 according to Eq. 10. This means the foreground object will stay in focus in the simulated image. The defocus blur $B_1$ for the background in $F_1$ should be greater than 0. So $B_2 - B_1$ should be greater than 0 according to Eq. 10. Therefore the defocus blur $B_2$ for the background in the simulated image will be larger than it is in $F_1$.

It will be appreciated that the user interface for the camera can be adapted in a number of different ways for controlling the simulation of larger apertures. By way of a first example, a user input control (e.g., a slider control, up and down buttons, or other means of selecting along a continuum) can be used to select "digital aperture" size for controlling the digital lens simulation. In a preferred embodiment, the display screen indicates a digital aperture setting. For example, if the valid aperture for a given lens is f/5.6, f/8, f/11, f/13, f/16 and the like, the lens simulation of the present invention can allow extending this to down to f/4, f/2.8, f/2, f/1.4, and so forth.

In another example, the camera may simply display the digital equivalent f-number, and thus allow the user to select along a range which is beyond that of the physical camera device. It will be appreciated that in regards to the present invention, the aperture is only extended in regards to apparent depth of focus for the resultant image and the associated off focal-plane blurring, as the digital aperture provided by the present invention is not capable of actually admitting more light into the lens as would arise using a physically larger aperture. In a preferred embodiment, the markings and/or display depict whether the camera is within the physical aperture range or using the digital aperture aspects of the invention.

In another example embodiment, the user can perform a simple button selection (e.g., "SLR blur background" effect) to turn on and off the digital aperture simulation. It should be appreciated that any of the user interface configurations described may operate in conjunction with a set of user established parameters which control how and when the digital aperturing of the present invention is to be utilized.

The digital aperturing feature of the present invention can also be coupled in combination with any of the existing camera features, and specifically those which detect a given set of image conditions. By way of example and not limitation, the digital aperture feature can be activated under user control when the face detection feature detects a portrait is being taken, wherein the extent of blur can be automatically controlled to keep the faces in focus and blur the background.

4. Depth of Field Rendering.

The depth of field simulation procedure consists of calibration, iteration map generation, and rendering. The purpose of calibration is to determine the slope k. A series of matching curves are generated, such as by capturing step edge images placed at different distances and with different focal length and aperture settings. From this data a linear model is then preferably generated for use as the matching curves. The slope k of the linear model may be obtained by linear least square fitting for the matching curves.

Suppose an image $F_1$ is captured at aperture $f/A_1$. The objective is to render this image as if it was captured at a larger aperture $f/A_2$. An example procedure for depth of field rendering using the model of Eq. 10 can be summarized as follows:

(a) Take another image $F_2$ at the same aperture $f/A_1$, with the distance between $F_1$ and $F_2$ being one depth of field.

(b) Divide $F_1$ and $F_2$ into small subimage blocks (e.g., 64×64 pixels for each block).

(c) For each block, calculate blur difference I. If $F_1$ is the sharper image (e.g., closer to the in-focus position) of the two images, then I can be utilized directly to calculate defocus blur using Eq. 4. However when $F_2$ is sharper, and I is used to calculate the amount of defocus blur, then the result would be the defocus blur for $F_2$ instead of for $F_1$. In response to the above an offset correction is performed, such as calculating s by s=I/k and then decreasing s by s←s−1. This corrected s is the distance between the lens position where $F_1$ is taken and the in-focus position, which can be used to calculate defocus blur $B_1$ using Eq. 4.

(d) For each block, calculate blur difference $B_2-B_1$ using Eq. 10. Whereby $B_2$ is the defocus blur for the image to be rendered.

(e) For each block, blur the image $F_1$ by a number of convolutions with the blur kernel according to the blur difference $B_2-B_1$. For computational efficiency, instead of performing convolution $B_2-B_1$ times, with blur kernel K, one convolution can be performed with a point spread function P. This point spread function can be approximated using a two-dimensional Gaussian blur filter with its variance being $\sigma_{Gauss}^2=(B_2-B_1)\sigma_K^2$, where $\sigma_K^2$ is the variance for the blur kernel K.

Figure 5:
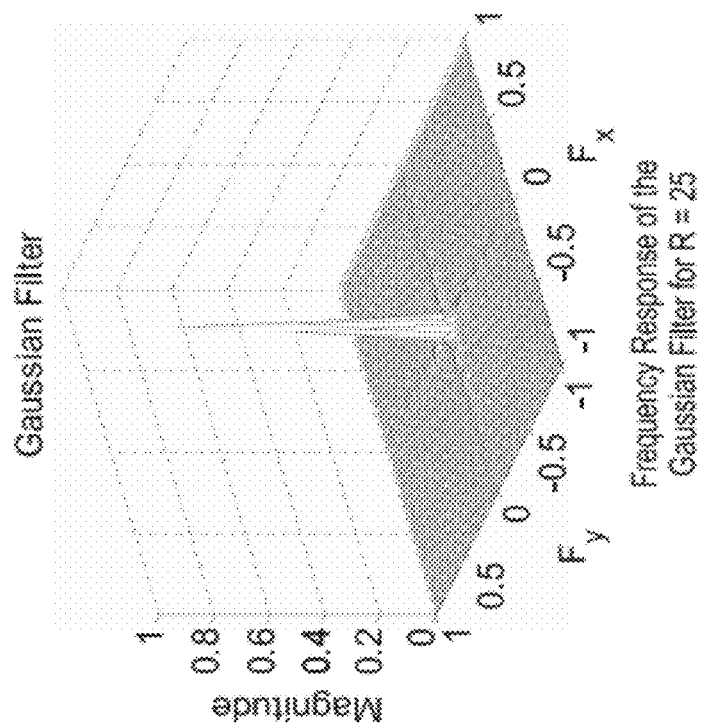
FIG. 5 is a 3D graph of frequency response for the Gaussian filter of FIG. 4.
Figure 4:
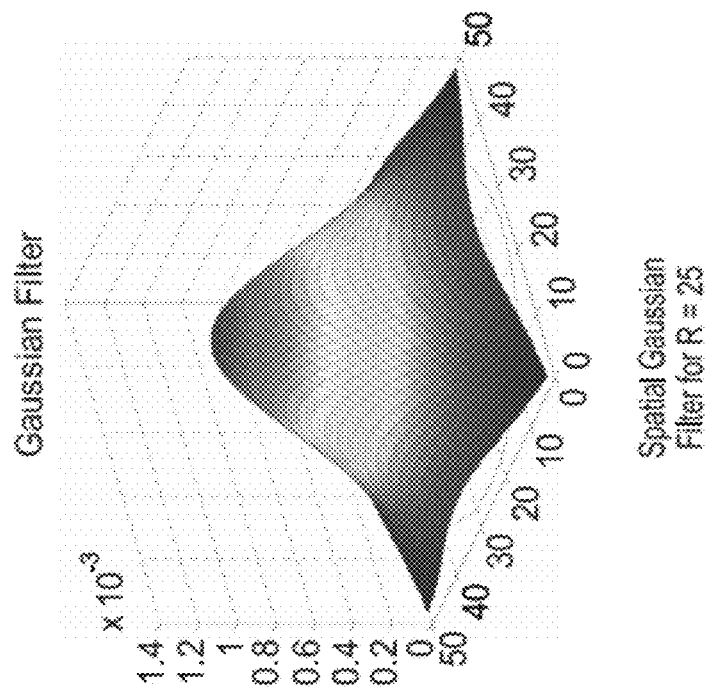
FIG. 4 is a 3D graph of a Gaussian filter for applying a selective blurring effect according to an aspect of the present invention.

FIG. 4 and FIG. 5 depicts a sample Gaussian blur filter and its frequency response for R=25. With a filter size of (2R+1)×(2R+1), where R is preferably $2\sigma_{Gauss}$.

5. Extension of Blur Simulation.

From the previous section it will be recognized that $\sigma_{Gauss}^2$ is proportional to the blur difference $B_2-B_1$. This can be extended to a more general form $\sigma_{Gauss}^2=(B_2^\gamma-B_1)(\sigma_K^2)$. The parameter γ can be used to create enhanced blur effect.

Figure 6:
FIG. 6 is an image captured at a low aperture setting having a deep focus.
Figure 7:
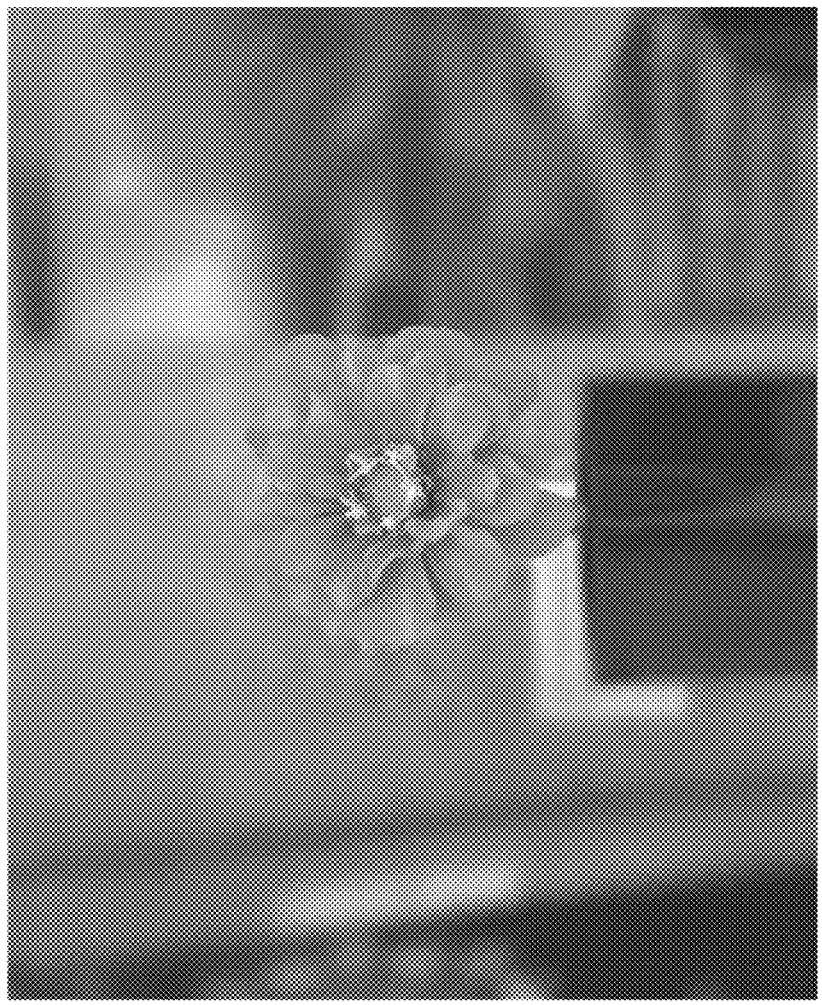
FIG. 7 is the image captured in FIG. 6, in response to the blur function modeling according to the present invention shown resulting in a shallow focus result.

FIG. 6 and FIG. 7 depict results using γ=1.25, with FIG. 6 showing an in focus image in response to the physically small aperture, while FIG. 7 depicts the simulated correction to a larger aperture using blur rendition. It can be seen from comparing the images that background structures and images, which are in a different image plane than the flower, are distractingly apparent in response to the deep physical focus of FIG. 6. Although the same camera and lens are used in FIG. 7, the depth of field rendering has simulated a shallow field of focus in the plane of the flower, wherein the background planes are blurred and thus far less distracting from the flower subject.

It should be appreciated that although the flower subject depicted in FIG. 7 has a generally circular area of interest, the present invention can provide for rendering depth of field on a depth of focus whose plane can have any arbitrary shape or shapes.

6. Generalized Inventive Embodiments.

The following provides by way of example and not limitation, a generalized description of aspects of the present invention in relation to accompanying flowcharts and a block diagram. It will be appreciated that the invention can be implemented in various ways and manners without departing from the teachings herein.

Figure 9:
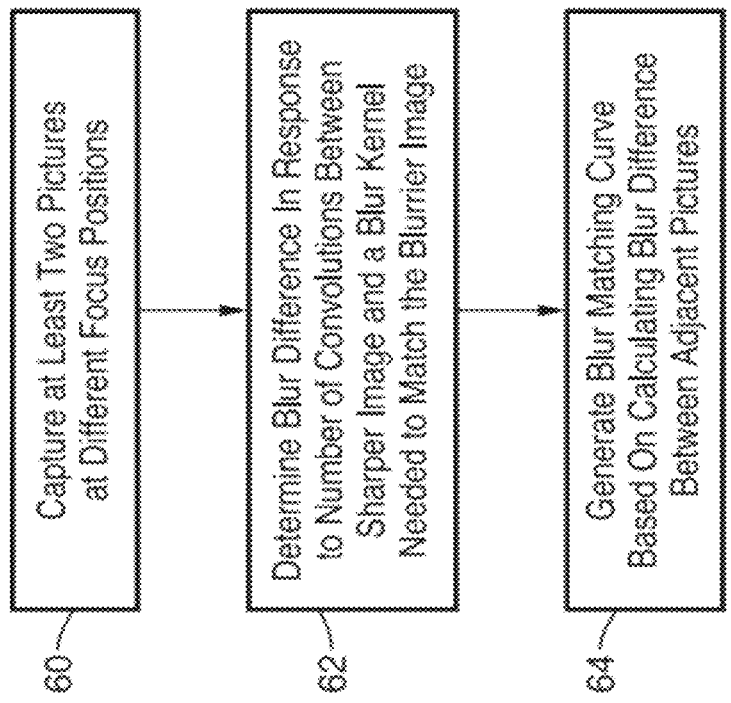
FIG. 9 is a flowchart of determining blur difference and generating a blur matching curve according to an aspect of the present invention.
Figure 8:
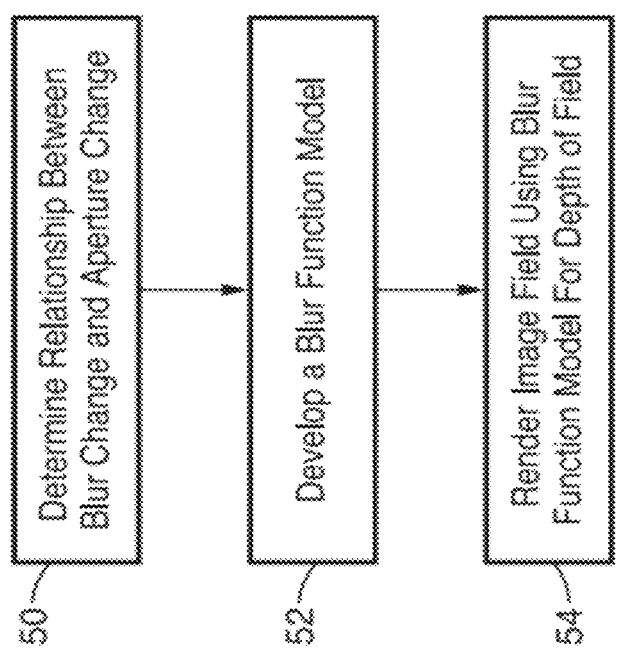
FIG. 8 is a flowchart of depth of field rendering according to an aspect of the present invention.
Figure 10:
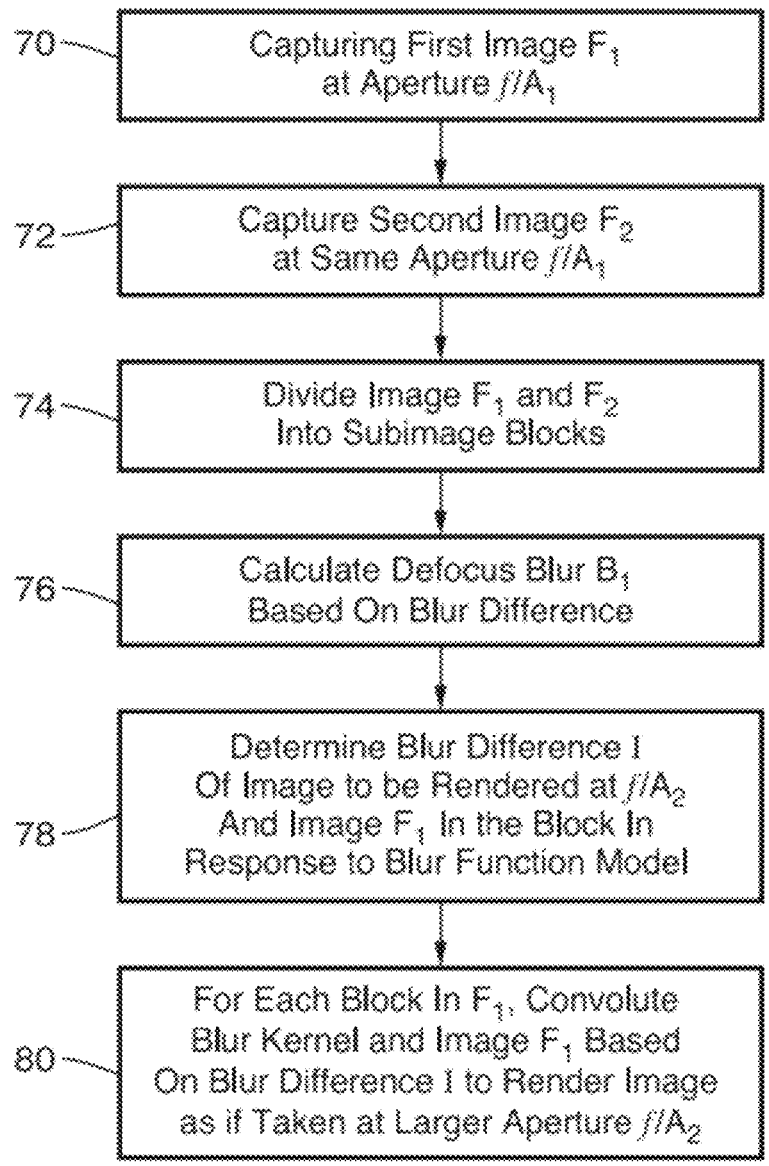
FIG. 10 is a flowchart of blur function modeling according to an aspect of the present invention.

FIG. 8 through FIG. 10 illustrate example embodiments of program flowcharts according to an aspect of the present invention for depth of field rendering in FIG. 8, determining blur difference and generating a blur matching curve in FIG. 9 and for blur function modeling in FIG. 10.

In FIG. 8 the generalized steps of the process for simulating a desired depth of field involve determining the relationship 50 between blur change and aperture change, developing a blur function model 52, and rendering an image 54 using the blur function model to thus introduce blur to a captured image so as to simulate the desired depth of field.

In FIG. 9 determining blur difference and generating a blur matching curve is performed by capturing 60 at least two images (digital pictures) at different focus positions. Blur difference is determined 62 in response to the number of convolutions between the sharper image and a blur kernel needed for matching the more blurry of the two images. A blur matching curve is generated 64 in response to determining blur differences between adjacent images, such as between every pair of images.

In FIG. 10 blur function modeling for depth of field rendering is performed in response to the following steps. A first image $F_1$ 70 and second image $F_2$ 72 are captured at different focus settings, but the same aperture $f/A_1$. The images are divided 74 into subimage blocks. Defocus blur is then calculated 76 based on blur difference. Blur difference I is determined 78 for $f/A_2$ and image $F_1$ in the block. Then blurring is applied 80 to each block in image $F_1$ in response to determined blur difference.

Figure 11:
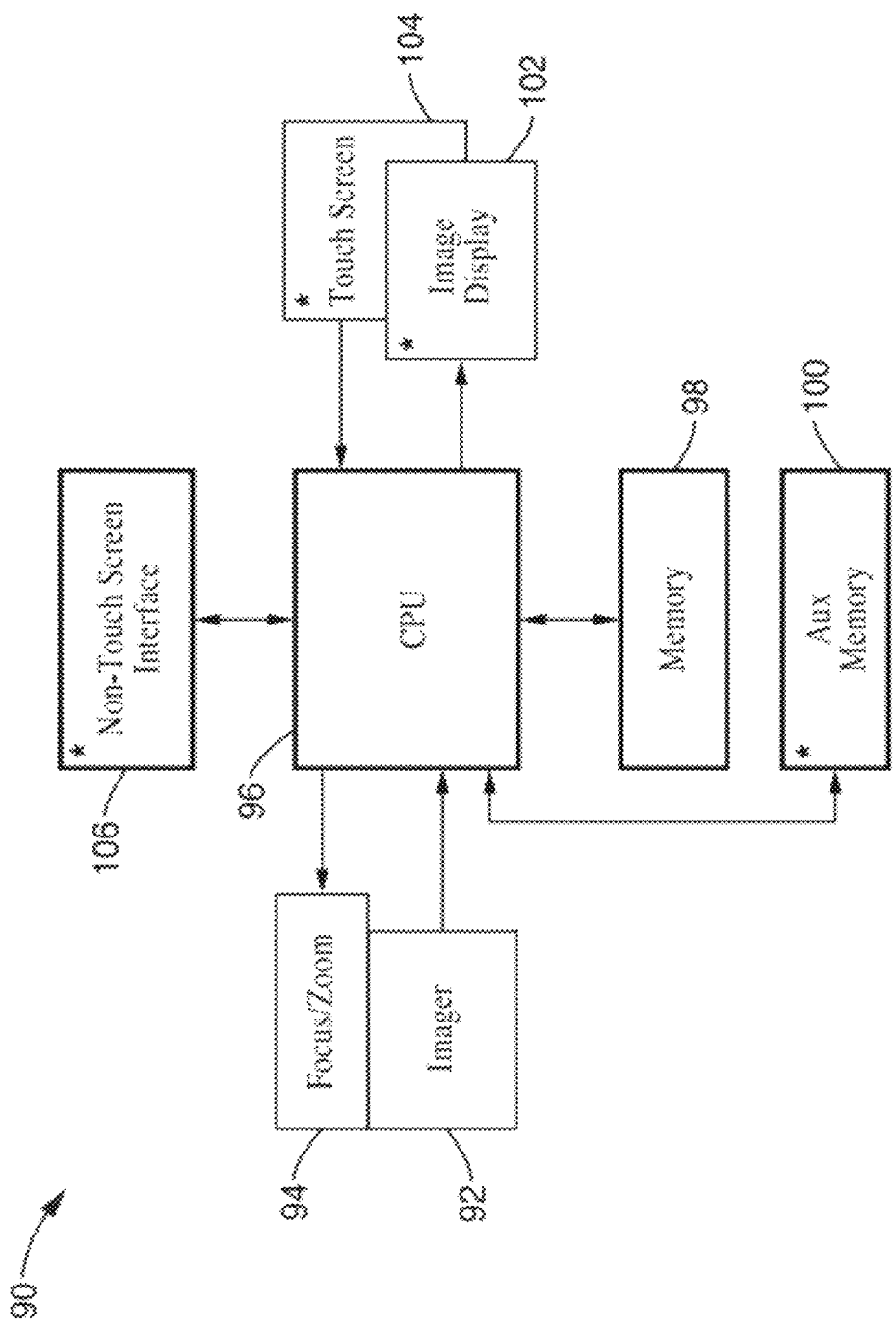
FIG. 11 is a block diagram of a camera system configured according to an aspect of the present invention for performing blur function modeling for depth of field rendering.

FIG. 11 illustrates an example embodiment 90 of a camera configured with the blur function field rendering according to the invention. It should be appreciated that the aspects of the present invention can be implemented on a variety of camera and image processing devices without departing from the teachings of the present invention, the following being described by way of example and not limitation.

An image capture device (camera) 90 is shown configured with an imager (imaging element) 92 and associated optics to which are coupled a focus control 94 for performing focus adjustments utilized according to the invention. It should be appreciated that focus control 94 can optionally include a zoom control. Operation of camera 90 is controlled by one or more computer processors (central processing units—CPUs) 96 and associated memory 98 (e.g., internal to the CPU, or in one or more separate integrated circuits). An auxiliary memory 100 is also shown by way of example, such as a memory card upon which captured images are stored. It will be appreciated that the processing performed by camera device 90 may by performed by a single processor for performing camera control functions as well as the image processing aspects described according to the present invention, or it may utilize multiple processors, such as one for the camera control functionality and one or more processors for performing image processing functionality. One of ordinary skill in the art will appreciate that the programming may be performed in various ways across multiple processors.

Computer processor 96 performs depth of field rendering according to the invention on images captured with camera 90. Shown by way of example are an optional image display 102 and touch screen 104, however, it will be appreciated that the method according to the present invention can be implemented on various image capture devices which are configured with an imager and associated lens and focus control element. An optional non-touch screen interface 106 is also shown to indicate that the controls for the camera may utilize any desired forms of user interface. It will be appreciated that extended aperture blur modeling according to the present invention and be selected and displayed according to various mechanisms utilizing user input/output 102, 104 and 106.

It should be appreciated that the depth of field rendering of the invention is performed by programming executable on computer processor 96 in combination with memory 98 and/or auxiliary memory 100. Inventive teachings can be applied in a variety of camera apparatus and applications which may benefit from augmented depth of field control, such as including digital still cameras, video cameras and so forth.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus comprise means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware as desired which perform the specified functions or steps, either separately, or more preferably in combination with computer execution means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

7. Aspect Summary.

This section summarizes, by way of example and not limitation, a number of implementations, modes and features described herein for the present invention.

The present invention provides methods and apparatus for rendering images which simulate the use of a larger aperture to provide a shallow field of focus. Inventive teachings can be applied in a variety of apparatus and applications, including still cameras and other image capture apparatus.

As can be seen, therefore, the present invention includes the following inventive embodiments among others:

1. An apparatus for depth of field rendering on captured images to simulate an out-of-focus effect as would arise in response to using a larger aperture, comprising: an imaging element having an aperture with a physical aperture size, and configured for capturing digital images at a focus setting; a computer processor, associated with a memory, and coupled to said imaging element and configured for processing digital images received from said imaging element; and programming executable on said computer processor for, capturing at least two images (a pair of images) which differs in focus positions using an identical aperture setting, dividing said images into subimage blocks, determining a blur difference between subimage blocks of said images based on a matching curve for said imaging element as a relationship between iteration number and lens focus position, determining a defocus blur between subimage blocks of said images, and blurring subimage blocks of said images by a number of convolutions with a blur kernel in response to blur difference determined between said images to generate a resultant image simulating utilization of a larger aperture.

2. An apparatus according to embodiment 1, wherein said apparatus generates a digital image captured with said imaging element at a first aperture setting which appears as if it has been captured at a second aperture setting which is larger than said first aperture setting.

3. An apparatus according to embodiment 1, wherein said matching curve is retained in the memory of said apparatus in response to capturing a sequence of images across a focal range of the apparatus to establish a relationship between iteration number and lens focus position.

4. An apparatus according to embodiment 1, wherein an amount of said defocus blur for an image can be determined in response to said matching curve by summing iteration numbers in an interval between an in-focus, first position, and a second position.

5. An apparatus according to embodiment 1, wherein slope of said matching curve is inversely proportional to f-number squaring.

6. An apparatus according to embodiment 1, wherein said defocus blur is given by $$B = \frac{1}{2}sI = \frac{1}{2}ks^2 = \frac{1}{2k}I^2$$

where said defocus blur B is determined in response to iteration number I, depths-of-field (DOFs) s away from an in-focus position, and matching curve slope k.

7. An apparatus according to embodiment 1, wherein said blur difference is given by equation $$B_2 - B_1 = \left[\frac{1}{h^2} - 1\right]B_1 = \left[\left(\frac{A_1}{A_2}\right)^2 - 1\right]B_1,$$

in which $B_1$ and $B_2$ is blurring level which would arise at first and second apertures $A_1$ and $A_2$ (f-number), and h is a constant defining extent of aperture change.

8. An apparatus according to embodiment 1, further comprising a user interface having at least one user input control on said apparatus which is configured for selecting a digital aperture size which exceeds physical aperture sizing that said apparatus is capable of attaining, or selecting an operating mode in which a digital aperture size is used which exceeds physical aperture sizing that said apparatus is capable of attaining.

9. An apparatus according to embodiment 1, further comprising selecting a digital aperture size which exceeds physical aperture sizing attainable by said apparatus in response to detecting a given set of image conditions.

10. An apparatus according to embodiment 1, further comprising: selecting a digital aperture size which exceeds physical aperture sizing attainable by said apparatus in response to detecting a given set of image conditions; and wherein said digital aperture size is selected in response to facial detection within an image being captured.

11. An apparatus according to embodiment 1, wherein said blurring subimage blocks is performed in response to using a two-dimensional Gaussian blur filter.

12. An apparatus according to embodiment 1, wherein said blurring subimage blocks comprises using an enhanced blur effect performed in response to a two-dimensional Gaussian blur filter having a variance $\sigma_{Gauss}^2$ given by $\sigma_{Gauss}^2 = (B_2^\gamma - B_1)\sigma_K^2$, in which $B_1$ is the defocus blur of a subimage block of a captured image, $B_2$ is the defocus blur of a corresponding subimage block of a simulated image, $\sigma_K^2$ is variance for blur kernel K, and parameter γ controls enhanced blur effect.

13. An apparatus for depth of field rendering on captured images to simulate out-of-focus effects as would arise in response to using a larger physical aperture than attainable on said apparatus, the apparatus comprising: an imaging element having an aperture with a physical aperture size, and configured for capturing digital images, at a focus setting; a computer processor and a memory coupled to said imaging element and configured for processing the digital images received from said imaging element; and programming executable on said computer processor for, detecting user input for selecting a digital aperture size, or a mode associated with use of a digital aperture size, capturing at least two images at different focus positions using an identical aperture setting, dividing said images into subimage blocks, determining a blur difference between subimage blocks of said images based on a matching curve for said imaging element as a relationship between iteration number and the focus position, determining a defocus blur between subimage blocks of said images, and blurring subimage blocks of said images by a number of convolutions with a blur kernel in response to the blur difference determined between images to generate a resultant image; wherein said resultant image is generated with an apparent digital aperture size which exceeds the physical aperture size that said apparatus is capable of attaining.

14. An apparatus according to embodiment 13, wherein said apparatus generates a digital image output captured with said imaging element at a first aperture setting which appears as if captured at a second aperture setting which is larger than said first aperture setting.

15. An apparatus according to embodiment 13, wherein said matching curve is retained in the memory of said apparatus in response to capturing a sequence of images across a focal range of the apparatus to establish a relationship between iteration number and lens focus position.

16. An apparatus according to embodiment 13, wherein in response to said matching curve, an amount of defocus blur of an image can be computed as a sum of iteration numbers in an interval between an in-focus position, first position, and a second position.

17. An apparatus according to embodiment 13, wherein slope of said matching curve is inversely proportional to f-number squaring.

18. An apparatus according to embodiment 13, wherein said defocus blur is given by $$B = \frac{1}{2}sI = \frac{1}{2}ks^2 = \frac{1}{2k}I^2$$

where defocus blur B is determined in response to iteration number I, depths-of-field (DOFs) s away from an in-focus position, and matching curve slope k.

19. An apparatus according to embodiment 13, wherein said blur difference is given by equation $$B_2 - B_1 = \left[\frac{1}{h^2} - 1\right]B_1 = \left[\left(\frac{A_1}{A_2}\right)^2 - 1\right]B_1,$$

in which $B_1$ and $B_2$ are blur levels at two different respective first and second apertures $A_1$ and $A_2$ (f-number), and h is a constant defining extent of aperture change.

20. An apparatus according to embodiment 13, further comprising a user interface having at least one user input control on said apparatus which is configured for selecting a digital aperture size which exceeds attainable physical aperture sizing of said apparatus, or selecting an operating mode in which a digital aperture size is used which exceeds attainable physical aperture sizing of said apparatus.

21. An apparatus according to embodiment 13, wherein said blurring subimage blocks is performed in response to using a two-dimensional Gaussian blur filter.

22. An apparatus according to embodiment 13, wherein said blurring subimage blocks comprises using an enhanced blur effect performed in response to a two-dimensional Gaussian blur filter having a variance $\sigma_{Gauss}^2$ given by $\sigma_{Gauss}^2 = (B_2^\gamma - B_1)\sigma_K^2$, in which $B_1$ is defocus blur of a subimage block of a captured image, $B_2$ is defocus blur of a corresponding subimage block of a simulated image, $\sigma_K^2$ is variance for blur kernel K, and parameter $\gamma$ controls enhanced blur effect.

23. A method of capturing images simulating an aperture larger than attainable by physical aperture sizing of an imaging element within a camera apparatus, comprising: capturing at least two images at different focus positions using an identical aperture setting of a camera apparatus; dividing said images into subimage blocks; determining blur differences between subimage blocks of said images based on a matching curve for said imaging element as a relationship between iteration number and lens focus position; determining defocus blur between subimage blocks of said images; and blurring subimage blocks of said images by convolution with a blur kernel in response to blur difference determined between images to generate a resultant image; wherein said resultant image is generated with an apparent digital aperture size which exceeds attainable physical aperture sizing of said camera apparatus.

24. A method according to embodiment 23, further comprising detecting user input for selecting a digital aperture size, or a mode associated with use of said digital aperture size, which exceeds the physical aperture sizing which is attainable.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for depth of field rendering on captured images to simulate an out-of-focus effect as would arise in response to using a larger aperture, comprising:
an imaging element having an aperture with a physical aperture size, and configured for capturing digital images at a focus setting;
a computer processor, associated with a memory, coupled to said imaging element and configured for processing the digital images received from said imaging element; and
programming executable on said computer processor for,
capturing at least a pair of images at a focus position which differs between said pair of images while using an identical aperture setting,
dividing said pair of images into subimage blocks,
determining a blur difference between subimage blocks of said pair of images based on a matching curve for said imaging element as a relationship between iteration number and the focus position,
determining a defocus blur between subimage blocks of said pair of images, and
blurring subimage blocks of said pair of images by a number of convolutions with a blur kernel in response to the blur difference determined between said pair of images to generate a resultant image simulating utilization of the larger aperture.

2. An apparatus as recited in claim 1, wherein said apparatus generates the digital images captured with said imaging element at a first aperture setting which appears as if it has been captured at a second aperture setting which is larger than said first aperture setting.

3. An apparatus as recited in claim 1, wherein said matching curve is retained in the memory of said apparatus in response to capturing a sequence of images across a focal range of said apparatus to establish the relationship between iteration number and the focus position.

4. An apparatus as recited in claim 1, wherein an amount of said defocus blur for an image can be determined in response to said matching curve by summing iteration numbers in an interval between an in-focus, first position, and a second position.

5. An apparatus as recited in claim 1, wherein slope of said matching curve is inversely proportional to f-number squaring.

6. An apparatus as recited in claim 1, wherein said defocus blur is given by $$B = \frac{1}{2}sI = \frac{1}{2}ks^2 = \frac{1}{2k}I^2$$

where said defocus blur B is determined in response to iteration number I, depths-of-field (DOFs) s away from an in-focus position, and the matching curve with slope k.

7. An apparatus as recited in claim 1, wherein said blur difference is given by equation $$B_2 - B_1 = \left[\frac{1}{h^2} - 1\right]B_1 = \left[\left(\frac{A_1}{A_2}\right)^2 - 1\right]B_1,$$

in which $B_1$ and $B_2$ is blurring level which would arise at first and second apertures $A_1$ and $A_2$ (f-number), and h is a constant defining extent of aperture change.

8. An apparatus as recited in claim 1, further comprising a user interface having at least one user input control on said apparatus which is configured for selecting a digital aperture size which exceeds physical aperture sizing that said apparatus is capable of attaining, or selecting an operating mode which sets the digital aperture size to exceed the physical aperture sizing that said apparatus is capable of attaining.

9. An apparatus as recited in claim 1, further comprising selecting a digital aperture size which exceeds physical aperture sizing attainable by said apparatus in response to detecting a given set of image conditions.

10. An apparatus as recited in claim 1, further comprising:
selecting a digital aperture size which exceeds physical aperture sizing attainable by said apparatus in response to detecting a given set of image conditions; and
wherein said digital aperture size is selected in response to facial detection within an image being captured.

11. An apparatus as recited in claim 1, wherein said blurring subimage blocks is performed in response to using a two-dimensional Gaussian blur filter.

12. An apparatus as recited in claim 1, wherein said blurring subimage blocks comprises using an enhanced blur effect performed in response to a two-dimensional Gaussian blur filter having a variance $\sigma_{Gauss}^2$ given by $\sigma_{Gauss}^2 = (B_2^\gamma - B_1)\gamma_K^2$, in which $B_1$ is the defocus blur of a subimage block of a captured image, $B_2$ is the defocus blur of a corresponding subimage block of a simulated image, $\sigma_K^2$ is the variance for the blur kernel K, and a parameter $\gamma$ controls the enhanced blur effect.

13. An apparatus for depth of field rendering on captured images to simulate out-of-focus effects as would arise in response to using a larger physical aperture than attainable on said apparatus, the apparatus comprising:
an imaging element having a physical aperture with a physical aperture size, and said imaging element is configured for capturing digital images, at a focus setting;
a computer processor and a memory coupled to said imaging element and configured for processing the digital images received from said imaging element; and
programming executable on said computer processor for,
detecting user input for selecting a digital aperture size, or a mode associated with use of the digital aperture size,
capturing at least a pair of images at a focus position which differs between said pair of images, while using an identical aperture setting,
dividing said pair of images into subimage blocks,
determining a blur difference between subimage blocks of said pair of images based on a matching curve for said imaging element as a relationship between iteration number and the focus position,
determining a defocus blur between subimage blocks of said pair of images, and
blurring subimage blocks of said images by a number of convolutions with a blur kernel in response to the blur difference determined between said pair of images to generate a resultant image;
wherein said resultant image is generated with an apparent digital aperture size which exceeds the physical aperture size that said apparatus is capable of attaining.

14. An apparatus as recited in claim 13, wherein said apparatus generates a digital image output with said imaging element at a first aperture setting which appears as if captured at a second aperture setting which is larger than said first aperture setting.

15. An apparatus as recited in claim 13, wherein said matching curve is retained in the memory of said apparatus in response to capturing a sequence of images across a focal range of said apparatus to establish the relationship between iteration number and the focus position.

16. An apparatus as recited in claim 13, wherein in response to said matching curve, an amount of defocus blur of an image can be computed as a sum of iteration numbers in an interval between an in-focus position, first position, and a second position.

17. An apparatus as recited in claim 13, wherein slope of said matching curve is inversely proportional to f-number squaring.

18. An apparatus as recited in claim 13, wherein said defocus blur B is given by $$B = \frac{1}{2}sI = \frac{1}{2}ks^2 = \frac{1}{2k}I^2,$$

and determined in response to iteration number I, depths-of-field (DOFs) s away from an in-focus position, and the matching curve with slope k.

19. An apparatus as recited in claim 13, wherein said blur difference is given by equation $$B_2 - B_1 = \left[\frac{1}{h^2} - 1\right]B_1 = \left[\left(\frac{A_1}{A_2}\right)^2 - 1\right]B_1,$$

in which $B_1$ and $B_2$ are blur levels at two different respective first and second apertures $A_1$ and $A_2$ (f-number), and h is a constant defining extent of aperture change.

20. An apparatus as recited in claim 13, further comprising a user interface having at least one user input control on said apparatus which is configured for selecting the digital aperture size to exceed the physical aperture size which is attainable by said apparatus, or selecting an operating mode which includes selecting the digital aperture size to exceed the physical aperture size which is attainable by said apparatus.

21. An apparatus as recited in claim 13, wherein said blurring subimage blocks is performed in response to using a two-dimensional Gaussian blur filter.

22. An apparatus as recited in claim 13, wherein said blurring subimage blocks comprises using an enhanced blur effect performed in response to a two-dimensional Gaussian blur filter having a variance $\sigma_{Gauss}^2$ given by $\sigma_{Gauss}^2 = (B_2^\gamma - B_1)\sigma_K^2$, in which $B_1$ is the defocus blur of a subimage block of a captured image, $B_2$ is the defocus blur of a corresponding subimage block of a simulated image, $\sigma_K^2$ is the variance for the blur kernel K, and a parameter $\gamma$ controls the enhanced blur effect.

23. A method of capturing images simulating an aperture larger than attainable by a physical aperture size of an imaging element within a camera apparatus, comprising:
capturing at least a pair of images at a focus position which differs between said pair of images, while using an identical aperture setting of the camera apparatus;
dividing said pair of images into subimage blocks;
determining blur differences between subimage blocks of said pair of images based on a matching curve for said imaging element as a relationship between iteration number and the focus position;
determining defocus blur between subimage blocks of said pair of images; and
blurring subimage blocks of said pair of images by convolution with a blur kernel in response to blur difference determined between said pair of images to generate a resultant image;

wherein said resultant image is generated with an apparent digital aperture size which exceeds the physical aperture size which is attainable by said camera apparatus.

24. A method as recited in claim 23, further comprising detecting user input for selecting a digital aperture size, or a mode associated with use of said digital aperture size, which exceeds the physical aperture size which is attainable on the camera apparatus.

* * * * *